United States Patent
Ren et al.

(10) Patent No.: US 9,692,871 B2
(45) Date of Patent: Jun. 27, 2017

(54) INFORMATION PROCESSING METHOD AND ELECTRONIC DEVICE

(71) Applicants: Beijing Lenovo Software Ltd., Beijing (CN); Lenovo (Beijing) Co., Ltd., Beijing (CN)

(72) Inventors: Jiao Ren, Beijing (CN); Xu Jia, Beijing (CN); Yuanyi Zhang, Beijing (CN); Cheng Guo, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 28 days.

(21) Appl. No.: 14/229,884

(22) Filed: Mar. 29, 2014

(65) Prior Publication Data
US 2015/0006161 A1  Jan. 1, 2015

(30) Foreign Application Priority Data
Jun. 28, 2013  (CN) .......................... 2013 1 0270271

(51) Int. Cl.
*G11C 7/16*    (2006.01)
*H04M 1/725*   (2006.01)

(52) U.S. Cl.
CPC ...... *H04M 1/7255* (2013.01); *H04M 2250/12* (2013.01)

(58) Field of Classification Search
CPC ....................... H04M 1/7255; H04M 2250/12
USPC ....................................................... 740/201
See application file for complete search history.

(56) References Cited

U.S. PATENT DOCUMENTS

| | | | | |
|---|---|---|---|---|
| 7,648,799 B2* | 1/2010 | Huang | ................ | H01M 2/0222 429/206 |
| 8,103,304 B1* | 1/2012 | Miller | ............... | H04M 1/72569 455/550.1 |
| 8,648,799 B1* | 2/2014 | Lloyd | ..................... | G06F 3/017 345/156 |
| 8,862,474 B2* | 10/2014 | Burke | ................... | G06F 3/0346 704/270 |
| 9,035,875 B1* | 5/2015 | Tseng | ...................... | G09G 5/00 345/156 |
| 2015/0018023 A1* | 1/2015 | Tomii | .................. | G06F 17/2785 455/466 |

\* cited by examiner

*Primary Examiner* — Tammy Paige Goddard
*Assistant Examiner* — Bharatkumar Shah
(74) *Attorney, Agent, or Firm* — Harness, Dickey & Pierce, P.L.C.

(57) ABSTRACT

An information processing method and an electronic device are disclosed. The information processing method is applied to a first electronic device. When the device orientation of the first electronic device is a first device orientation at a first time instant, the method includes: obtaining, by a first sensor of the first electronic device, a first sensing parameter indicating that the device orientation is a second device orientation at a second time instant after the first time instant; determining, based on the first sensing parameter, whether the second device orientation differs from the first device orientation, and obtaining a first determination; and generating a first instruction for entering into a voice record state when the second device orientation differs from the first device orientation and the second device orientation meets a predetermined condition.

20 Claims, 6 Drawing Sheets

INFORMATION PROCESSING METHOD AND ELECTRONIC DEVICE

The present application claims the priority to Chinese Patent Application No. 201310270271.4, entitled "INFORMATION PROCESSING METHOD AND DEVICE", filed on Jun. 28, 2013 with the State Intellectual Property Office of People's Republic of China, which is incorporated herein by reference in its entirety.

FIELD

The present invention relates to the field of electronic technology, and in particular to an information processing method and an electronic device.

BACKGROUND

With the development of technology, various types of voice software, such as QQ voice, WeChat and YY voice are developed. Specifically, a mode for realizing voice recording is generally to find out an icon corresponding to voice software, then double-click or click the voice software icon and finally click a voice recording button.

The inventor finds at least found the following issues in the conventional technology.

In the conventional technology, in order to enable an electronic device to enter into a voice record state, it is necessary to firstly find an icon corresponding to voice software implementing a voice recording function, then double-click or click the icon corresponding to the voice software to open the voice software by a finger, a touch-control pen or a physical key, and then click a voice recording button. However, there is a large amount of applications in a current electronic device, thus the icon corresponding to the voice software may be found after turning several pages, resulting in a complicate operation and a bad user experience. Therefore, there is the technical issue that the operation for entering into a voice record state is complicated in the electronic device in the conventional technology.

SUMMARY

An information processing method and an electronic device are provided in embodiments of the present invention to address the technique issue of complicated operation for entering into a voice record state, which is presenting in electronic device of the conventional technology, to achieve a technique effect of entering into a voice record state quickly.

The present application provides an information processing method, applied to a first electronic device. When the device orientation of the first electronic device is a first device orientation at a first time instant, the information processing method includes:

obtaining, by a first sensor of the first electronic device, a first sensing parameter indicating that the device orientation is a second device orientation at a second time instant posterior to the first time instant;

determining, based on the first sensing parameter, whether the device orientation is adjusted from the first device orientation to the second device orientation that differs from the first device orientation, and obtaining a first determination result; and generating a first instruction for entering into a voice record state in the case that the first determination result indicates that the device orientation is adjusted from the first device orientation to the second device orientation and the second device orientation meets a predetermined condition, to enable the first electronic device or a second electronic device that differs from the first electronic device to enter into the voice record state in response to the first instruction.

Optionally, the step of generating a first instruction for entering into a voice record state in the case that the first determination result indicates that the device orientation is adjusted from the first device orientation to the second device orientation and the second device orientation meets a predetermined condition includes:

determining whether the second device orientation meets a predetermined condition and obtaining a second determination result, if the first determination result indicates that the device orientation is adjusted from the first device orientation to the second device orientation; and generating the first instruction for entering into the voice record state, if the second determination result indicates that the second device orientation meets the predetermined condition.

Optionally, the step of determining whether the second device orientation meets a predetermined condition and obtaining a second determination result includes:

obtaining a second distance between the first electronic device and a reference plane in the case that the device orientation is the second device orientation, and obtaining a first distance between the first electronic device and the reference plane in the case that the device orientation is the first device orientation; and determining whether the second distance is less than the first distance and obtaining the second determination result;

if the second determination result indicates that the second distance is less than the first distance, it is indicated that the second device orientation meets the predetermined condition.

Optionally, the step of determining whether the second device orientation meets a predetermined condition and obtaining a second determination result includes:

obtaining a second distance between the first electronic device and a reference plane in the case that the device orientation is the second device orientation, and obtaining a first distance between the first electronic device and the reference plane in the case that the device orientation is the first device orientation;

determining whether the second distance is less than the first distance, and obtaining a third determination result; and determining whether the second distance is within a predetermined range of distance and obtaining the second determination result, if the third determination result indicates that the second distance is less than the first distance;

if the second determination result indicates that the second distance is within the predetermined range of distance, it is indicated that the second device orientation meets the predetermined condition.

Optionally, the step of determining whether the second device orientation meets a predetermined condition and obtaining a second determination result includes:

obtaining a second distance between the first electronic device and a reference plane in the case that the device orientation is the second device orientation, and obtaining a first distance between the first electronic device and the reference plane in the case that the device orientation is the first device orientation;

obtaining a second temperature value of a second environment of the first electronic device in the case that the device orientation is the second device orientation, and obtaining a first temperature value of a first environment of the first electronic device in the case that the device orientation is the first device orientation;

determining whether the second distance is less than the first distance and obtaining a fourth determination result; and determining whether the second temperature value is larger than the first temperature value and obtaining the second determination result if the fourth determination result indicates that the second distance is less than the first distance;

if the second determination result indicates that the second temperature value is larger than the first temperature value, it is indicated that the second device orientation meets the predetermined condition.

Optionally, the step of determining whether the second device orientation meets a predetermined condition and obtaining a second determination result includes:

obtaining a second distance between the first electronic device and a reference plane in the case that the device orientation is the second device orientation, and obtaining a first distance between the first electronic device and the reference plane in the case that the device orientation is the first device orientation;

obtaining a second angle value of the first electronic device with respect to a predetermined plane in the case that the device orientation is the second device orientation, and obtaining a first angle value of the first electronic device with respect to the predetermined plane in the case that the device orientation is the first device orientation;

determining whether the second distance is less than the first distance and obtaining a fifth determination result; and determining whether the second angle value is larger than the first angle value and obtaining the second determination result, if the fifth determination result indicates that the second distance is less than the first distance;

if the second determination result indicates that the second angle value is larger than the first angle value, it is indicated that the second device orientation meets the predetermined condition.

Optionally, the step of determining whether the second device orientation meets a predetermined condition and obtaining a second determination result includes:

obtaining a second temperature value of a second environment of the first electronic device in the case that the device orientation is the second device orientation, and obtaining a first temperature value of a first environment of the first electronic device in the case that the device orientation is the first device orientation;

determining whether the second temperature value is larger than the first temperature value and obtaining a sixth determination result; and determining whether the second temperature value is within a predetermined range of temperature and obtaining the second determination result, if the sixth determination result indicates that the second temperature value is larger than the first temperature value;

if the second determination result indicates that the second temperature value is within the predetermined range of temperature, it is indicated that the second device orientation meets the predetermined condition.

Optionally, the step of determining whether the second device orientation meets a predetermined condition and obtaining a second determination result includes:

obtaining a second angle value of the first electronic device with respect to a predetermined plane in the case that the device orientation is the second device orientation, and obtaining a first angle value of the first electronic device with respect to the predetermined plane in the case that the device orientation is the first device orientation;

determining whether the second angle value is larger than the first angle value and obtaining a seventh determination result; and determining whether the second angle value is within a predetermined range of angle and obtaining the second determination result, if the seventh determination result indicates that the second angle value is larger than the first angle value;

if the second determination result indicates that the second angle value is within the predetermined range of angle, it is indicated that the second device orientation meets the predetermined condition.

Optionally, after generating the first instruction for entering into the voice record state, the method further includes:

detecting whether there is a voice input from the outside of the first electronic device or the second electronic device during a predetermined time period and obtaining a first detection result; and generating a second instruction for exiting from the voice record state and exiting from the voice record state by the second instruction, if the first detection result indicates that there is no voice input during the predetermined time.

Optionally, if the first electronic device has a voice recording function, the step of generating a first instruction for entering into the voice record state includes:

generating a first starting instruction for entering into the voice record state, to enable the first electronic device to enter into the voice record state to record outer voice by executing the first starting instruction.

Optionally, if the first electronic device does not have a voice recording function, the step of generating a first instruction for entering into the voice record state includes:

generating a first control instruction for entering into the voice record state, to enable the first electronic device to generate a second starting instruction by executing the first control instruction, and then entering into the voice record state to record outer voice by executing the second starting instruction.

In the present disclosure, there is also provided an electronic device, including:

a first obtaining unit, configured to obtain, by a first sensor of the electronic device, a sensing parameter indicating that the device orientation is a second device orientation at a second time instant posterior to the first time instant in the case that the device orientation of the electronic device is a first device orientation at a first time instant;

a first determining unit, configured to determine, based on the first sensing parameter, whether the device orientation is adjusted from the first device orientation to the second device orientation that differs from the first device orientation, and obtain a first determination result; and a first processing unit, configured to generate a first instruction for entering into a voice record state to enable the electronic device or a second electronic device that differs from the electronic device to enter into the voice record state in response to the first instruction in the case that the first determination result indicates that the device orientation is adjusted from the first device orientation to the second device orientation and the second device orientation meets a predetermined condition.

Optionally, the first processing unit includes:

a first determining module, configured to determine whether the second device orientation meets a predetermined condition and obtain a second determination result, if the first determination result indicates that the device orientation is adjusted from the first device orientation to the second device orientation; and a first generating module, configured to generate the first instruction for entering into the voice record state, if the second determination result indicates that the second device orientation meets the predetermined condition.

Optionally, the first determining module includes:

a first obtaining sub-module, configured to obtain a second distance between the electronic device and a reference plane in the case that the device orientation is the second device orientation, and obtain a first distance between the electronic device and the reference plane in the case that the device orientation is the first device orientation; and a first determining sub-module, configured to determine whether the second distance is less than the first distance and obtain the second determination result;

if the second determination result indicates that the second distance is less than the first distance, it is indicated that the second device orientation meets the predetermined condition.

Optionally, the first determining module includes:

a second obtaining sub-module, configured to obtain a second distance between the electronic device and a reference plane in the case that the device orientation is the second device orientation, and obtain a first distance between the electronic device and the reference plane in the case that the device orientation is the first device orientation;

a second determining sub-module, configured to determine whether the second distance is less than the first distance and obtain a third determination result; and a third determining sub-module, configured to determine whether the second distance is within a predetermined range of distance and obtain the second determination result, if the third determination result indicates that the second distance is less than the first distance;

if the second determination result indicates that the second distance is within the predetermined range of distance, it is indicated that the second device orientation meets the predetermined condition.

Optionally, the first determining module includes:

a third obtaining sub-module, configured to obtain a second distance between the electronic device and a reference plane in the case that the device orientation is the second device orientation, and obtain a first distance between the electronic device and the reference plane in the case that the device orientation is the first device orientation;

a fourth obtaining sub-module, configured to obtain a second temperature value of a second environment of the electronic device in the case that the device orientation is the second device orientation, and obtain a first temperature value of a first environment of the electronic device in the case that the device orientation is the first device orientation;

a fourth determining sub-module, configured to determine whether the second distance is less than the first distance and obtain a fourth determination result; and a fifth determining sub-module, configured to determine whether the second temperature value is larger than the first temperature value and obtain the second determination result, if the fourth determination result indicates that the second distance is less than the first distance;

if the second determination result indicates that the second temperature value is larger than the first temperature value, it is indicated that the second device orientation meets the predetermined condition.

Optionally, the first determining module includes:

a fifth obtaining sub-module, configured to obtain a second distance between the electronic device and a reference plane in the case that the device orientation is the second device orientation, and obtain a first distance between the electronic device and the reference plane in the case that the device orientation is the first device orientation;

a sixth obtaining sub-module, configured to obtain a second angle value of the electronic device with respect to a predetermined plane in the case that the device orientation is the second device orientation, and obtain a first angle value of the electronic device with respect to the predetermined plane in the case that the device orientation is the first device orientation;

a sixth determining sub-module, configured to determine whether the second distance is less than the first distance and obtaining a fifth determination result; and a seventh determining sub-module, configured to determine whether the second angle value is larger than the first angle value and obtaining the second determination result, if the fifth determination result indicates that the second distance is less than the first distance;

if the second determination result indicates that the second angle value is larger than the first angle value, it is indicated that the second device orientation meets the predetermined condition.

Optionally, the first determining module includes:

a seventh obtaining sub-module, configured to obtain a second temperature value of a second environment of the electronic device in the case that the device orientation is the second device orientation, and obtain a first temperature value of a first environment of the electronic device in the case that the device orientation is the first device orientation;

an eighth determining sub-module, configured to determine whether the second temperature value is larger than the first temperature value and obtain a sixth determination result; and a ninth determining sub-module, configured to determine whether the second temperature value is within a predetermined range of temperature and obtain the second determination result if the sixth determination result indicates that the second temperature value is larger than the first temperature value;

if the second determination result indicates that the second temperature value is within the predetermined range of temperature, it is indicated that the second device orientation meets the predetermined condition.

Optionally, the first determining module includes:

an eighth obtaining sub-module, configured to obtain a second angle value of the electronic device with respect to a predetermined plane in the case that the device orientation is the second device orientation, and obtain a first angle value of the electronic device with respect to the predetermined plane in the case that the device orientation is the first device orientation;

a tenth determining sub-module, configured to determine whether the second angle value is larger than the first angle value and obtain a seventh determination result; and an eleventh determining sub-module, configured to determine whether the second angle value is within a predetermined range of angle and obtain the second determination result, if the seventh determination result indicates that the second angle value is larger than the first angle value;

if the second determination result indicates that the second angle value is within the predetermined range of angle, it is indicated that the second device orientation meets the predetermined condition.

Optionally, the electronic device further including:

a first detecting unit, configured to detect whether there is a voice input from outside of the electronic device or the second electronic device during a predetermined time period and obtain a first detection result; and a second processing unit, configured to generate a second instruction for exiting from the voice record state and exit from the voice record state by the second instruction, if the first detection result indicates that there is no voice input during the predetermined time.

Optionally, The electronic device according claim 20, wherein, in the case that the electronic device has a voice recording function, the first generating module is configured to:

generate a first starting instruction for entering into the voice record state, to enable the electronic device to enter into the voice record state to record outer voice by executing the first starting instruction.

Optionally, in the case that the electronic device does not have a voice recording function, the first generating module is configured to:

generate a first control instruction for entering into the voice record state, to enable the electronic device to generate a second starting instruction by executing the first control instruction, and then enter into the voice record state to record outer voice by executing the second starting instruction.

One or more technical schemes of the embodiments of the present application described above have at least one or more technical effects as follows.

First, in the present application, a first sensing parameter of the first electronic device in the second device orientation is detected by a sensor, based on which whether the device orientation of the first electronic device changes is determined. In the case that the device orientation of the first electronic device changes and the changed second device orientation meets the predetermined condition, it is indicated that the first electronic device is changed into a voice device orientation, representing that a user needs the electronic device to enter into the voice record state automatically to perform a voice recording. In this case, the electronic device enters into the voice record state automatically. Thus, it is avoided that the user looks for the first voice software among a large amount of applications in the electronic device and then manually starts the first voice software and clicks the voice recording button. Thus the technical issue that the operation for entering into the voice record state is complicate in the electronic device in the conventional technology is addressed and the technical effect of rapidly performing voice recording is achieved.

Second, the present application provides to the user multiple modes for rapidly entering into the voice record state. For example, entering into the voice record state is triggered by detecting a distance change between the first electronic device and the reference plane, or by changing the angle of the electronic device, or by changing the temperature outside the electronic device. Therefore, the user may start the voice recording function by selecting any one of the above modes according to their requirements or habits to trigger the device to enter into the voice record state and perform the voice recording, rather than being limited to touch-controlling a shortcut icon. In addition, the mode for entering into the voice recording provided by the present application more conforms to a nature action for the performing the voice recording, such as making the electronic device close to the mouth by changing the distance to the electronic device, resulting in a more intelligent technical effect and a better user experience.

Third, in the present application, in the case that the electronic device is in the voice record state, whether there is voice information input or output is further detected in a predetermined time period to determine whether the user is still using the voice recording function. If the voice information input or output is not detected in the predetermined time period, it is indicated that the user is not using the voice recording function, and the electronic device exits from the voice record state automatically. Thus the waste of resources for keeping in the voice record state is reduced effectively.

DETAILED DESCRIPTION

In the technical solutions according to the embodiments of the disclosure, a sensing parameter in the case that an electronic device is in a second device orientation is obtained. It is determined, based on the sensing parameter, whether the device orientation of the electronic device is changed and meets a predetermined condition of the device orientation for entering into a voice record state. If the device orientation of the electronic device is changed and meets the predetermined condition, it is indicated that the user needs to perform voice recording at the second device orientation. At this time, the electronic device enters automatically into the voice record state, and it is avoided that the corresponding voice recording function is initiated manually by a user. Thus a technical issue in the conventional technology is addressed that the operation for entering into the voice record state is complex in the electronic device, and the technical effect for quickly performing voice recording is achieved.

A main implementation principle of the technical solutions according to the embodiments of the disclosure, specific embodiments and the corresponding advantageous effects is set forth in detail with reference to the accompanying drawings hereinafter.

First Embodiment

Figure 1:
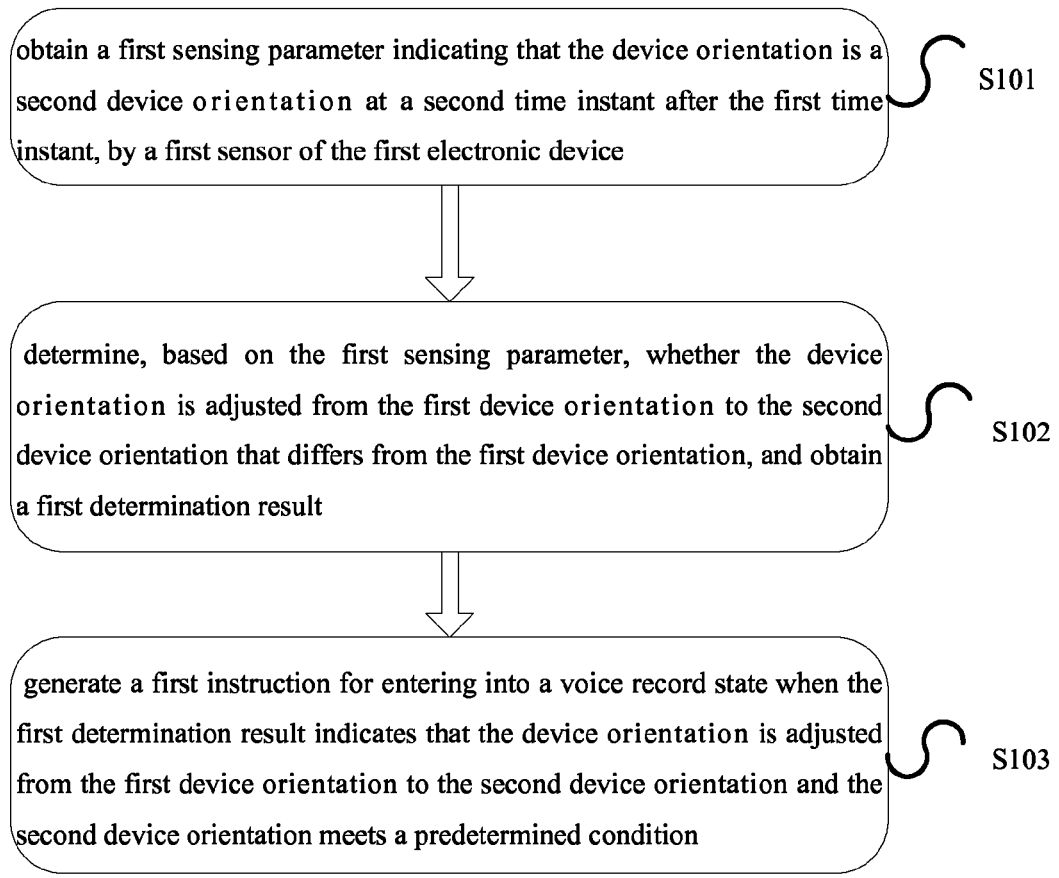
FIG. 1 is a flowchart of an information processing method provided by a first embodiment according to the present application.

Referring to FIG. 1, an information processing method according to an embodiment of the disclosure is applied to an electronic device. The method includes Step 101 to Step 103, in the case that the device orientation of the electronic device is in a first device orientation at a first time instant.

S101 is to obtain, by a first sensor of the first electronic device, a first sensing parameter indicating that the device orientation is a second device orientation at a second time instant posterior to the first time instant.

S102 is to determine, based on the first sensing parameter, whether the device orientation is adjusted from the first device orientation to the second device orientation that differs from the first device orientation, and obtain a first determination result.

S103 is to generate a first instruction for entering into a voice record state in the case that the first determination result indicates that the device orientation is adjusted from the first device orientation to the second device orientation and the second device orientation meets a predetermined condition, to enable the first electronic device or a second electronic device that differs from the first electronic device to enter into the voice record state in response to the first instruction.

In practical application, the first electronic device may be a first electronic device that may easily change the device orientation, such as a mobile phone, a pad and a remote controller. For example, the user may bring conveniently the mobile phone from a pocket to a position before his eyes. The orientation is a position that is presented by the electronic device with respect to the reference at a certain time instant. The orientation of the electronic device may be described by parameters, such as distance, angle, height and temperature. For example, the orientation of the mobile phone at the current time instant is being held horizontally on the user's hand, or being positioned vertically at a position of 50 cm from the user's face, or being tilted in an angle of 70 degrees with the user's wrist and so on. It can be seen that there are many kinds of the device orientation of the electronic device, and the user can keep the electronic device in different device orientations as required. Therefore, the disclosure learns whether the user needs to use the voice recording function according to the device orientation of the electronic device. A specific method is as follows.

When the electronic device is in the first device orientation at the first time instant, a second sensing parameter describing the first device orientation is obtained by the first sensor of the electronic device, and then S101 is performed.

S101 may be specifically obtaining the first sensing parameter indicating that the electronic device is in the second device orientation by the first sensor such as a distance sensor, a gravity sensor or a temperature sensor. Specifically, different first sensors obtain different first sensing parameters.

(1). in the case that the first sensor is the distance sensor, the obtained first sensing parameter is a second distance of the electronic device from a reference plane at the second time instant. Specifically, the reference plane may be the plane which the user's mouth or chin is located at. The second distance of the electronic device from the reference plane is obtained, which is configured for determining whether the second device orientation which the first electronic device is in differs from the first device orientation, and further determining whether the second device orientation which the electronic device is in is the voice device orientation for using voice software.

(2). in the case that the first sensor is the gravity sensor, the obtained first sensing parameter is a second angle of the first electronic device with respect to the first predetermined plane in the case that the first electronic device is in the second device orientation. Specifically, the gravity sensor may calculate the tilting angle of the electronic device with respect to the horizontal plane, by measuring variance in the acceleration due to the gravity. Therefore, herein, the second angle of the electronic device with respect to the first predetermined plane may be obtained by the gravity sensor. The first electronic device may determine whether the second device orientation which the first electronic device is in differs from the first device orientation according to the second angle detected by the sensor.

(3). in the case that the first sensor is the temperature sensor, the obtained first sensing parameter is a second temperature of the second environment around the first electronic device in the case that the first electronic device is in the second device orientation. Specifically, non-contact temperature sensors may detect variance in the temperature of the second environment around the electronic device. The electronic device may determine whether the second device orientation which the first electronic device is in differs from the first device orientation according to the second temperature.

After the first sensing parameter is obtained by the above-mentioned different first sensors, S102 is further performed. It is determined, according to the first sensing parameter, whether the device orientation of the first electronic device is changed, that is, whether the second device orientation differs from the first device orientation. Specifically, invoking the second sensing parameter obtained by the first sensor in the case that the first electronic device is in the first device orientation, determining whether the first sensing parameter is the same as the second sensing parameter and obtaining the first determination result. Since the first sensor may be the distance sensor, the gravity sensor or the temperature sensor, the invoked second sensing parameter may be the first distance, the first angel or the first temperature. In the case that the first sensor is different, it is determined whether the first sensing parameter is the same as the second sensing parameter, and the first determination result is obtained. Specifically, it is as follows.

(1). in the case that the first sensor is the distance sensor, it is determined whether the second distance is the same as the first distance. If the second distance is the same as the first distance, the first determination result is obtained that the device orientation is not adjusted to the second device orientation that differs from the first device orientation, that is, the second device orientation is the same as the first device orientation, and the device orientation is not changed. If the second distance is different from the first distance, the first determination result is obtained that the device orientation is adjusted from the first device orientation to the second device orientation that differs from the first device orientation, that is, the orientation of the electronic device is changed.

(2). in the case that the first sensor is the gravity sensor, it is determined whether the second angle is the same as the first angle. If the second angle is the same as the first angle, the first determination result is obtained that the device orientation is not adjusted to the second device orientation that differs from the first device orientation, that is, the second device orientation is the same as the first device orientation, and the device orientation is not changed. If the second angle is different from the first angle, the first determination result is obtained that the device orientation is adjusted from the first device orientation to the second device orientation that differs from the first device orientation, that is, the orientation of the electronic device is changed.

(3). in the case that the first sensor is the temperature sensor, it is determined whether the second temperature is the same as the first temperature. If the second temperature is the same as the first temperature, the first determination result is obtained that the device orientation is not adjusted to the second device orientation that differs from the first device orientation, that is, the second device orientation is the same as the first device orientation, and the device orientation is not changed. If the second temperature is different from the first temperature, the first determination result is obtained that the device orientation is adjusted from the first device orientation to the second device orientation that differs from the first device orientation, that is, the orientation of the electronic device is changed.

After the first determination result is obtained by any of the above-mentioned manners, S103 is further performed. Specifically, the first instruction for initiating the first voice software is generated in S103, and the first instruction includes: determining whether the second device orientation meets a predetermined condition and obtaining a second determination result if the first determination result indicates that the device orientation is adjusted from the first device orientation to the second device orientation; generating the first instruction for entering into the voice record state if the second determination result indicates that the second device orientation meets the predetermined condition, to enable the first electronic device or a second electronic device that differs from the first electronic device to enter into the voice record state in response to the first instruction.

In S103, the predetermined condition is specifically the condition met by the voice device orientation which the first electronic device is in when the user needs to use the voice recording function of the first voice software; the device orientation is adjusted to the second device orientation and meets the predetermined condition, that is, it is indicated that the device orientation of the first electronic device is changed and the changed second device orientation is the voice device orientation of entering into the voice record state, which indicates that the user needs to use the voice recording function at this time. Thus, the first instruction for entering into the voice record state is generated automatically, to enter quickly into the voice record state and perform voice recording.

In practical application, the voice record state specifically refers to the state when the electronic device performs the voice recording function by means of the first voice software. The first voice software may be an application software or a system software with the voice recording function. The first instruction is performed by the first electronic device to enable the first electronic device or the second electronic device to enter into the voice record state and the specific process thereof may be: firstly, detecting whether the first voice software in the first electronic device or the second electronic device is initiated. If the first voice software has been initiated, the voice recording function of the first voice software is initiated correspondingly, thereby enabling the first electronic device or the second electronic device to enter into the voice record state and perform voice recording. For example, in the case that the first electronic device such as the mobile phone is running a WeChat, the voice recording function of the WeChat is initiated directly for performing voice recording in the case that the mobile phone is changed into the voice device orientation, and it is not necessary to press the voice recording button by hands to perform voice recording. Or the inactive first voice software is initiated and the voice recording function of the first voice software is initiated, to enable the first electronic device or the second electronic device to enter into the voice record state and perform voice recording. For example, in the case that there is no any voice software running on the first electronic device such as the mobile phone, the mobile phone initiates automatically the first voice software in the case that the mobile phone is changed into the voice device orientation. At this time, the first voice software may be a voice software preset by the user, such as a music voice software, and the voice recording function of the first voice software is immediately initiated for performing voice recording.

Figure 2:
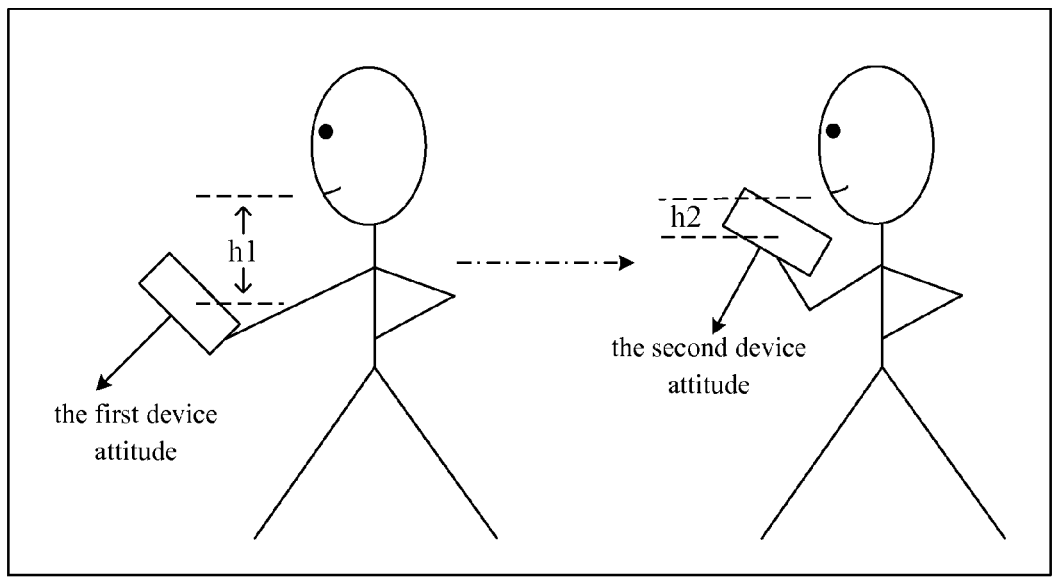
FIG. 2 is a schematic diagram in the case that a second device orientation meets a predetermined condition I according to a first embodiment of the present application.

The first electronic device may be the electronic device furnished with the first voice software, such as the mobile phone and the pad; alternatively, may also be the electronic device connected to the second electronic device furnished with the first voice software. For example, the first electronic device is the remote controller capable of controlling the second electronic device to initiate the first voice software of the second electronic device. There are two manners of initiating the first voice software. The first manner is: in the case that the first electronic device has the voice recording function, that is, the first electronic device is furnished with the first voice software, the first instruction generated by the first electronic device is a first initiating instruction and the first instruction is performed by the first electronic device to enter into the voice record state and perform voice recording. The second manner is: in the case that the first electronic device does not have the voice recording function while the second electronic device has the voice recording function, that is, the second electronic device is furnished with the first voice software, the first electronic device can not enter into the voice record state, however the first electronic device generates a first controlling instruction for controlling the initiation of the first voice software, and the second electronic device is triggered to generate a second initiating instruction by the first controlling instruction to enable the second electronic device to enter into the voice record state, In practical application, the predetermined condition characterizing the second device orientation is changed into the voice device orientation can be defined specifically as a combination of any one or more conditions as following:

I. Referring to FIG. 2, a second distance h2 between a first electronic device in a second device orientation and a reference plane is less than a first distance h1 between the first electronic device in a first device orientation and a reference plane. Specifically, the reference plane may be a plane of the user's mouth or chin. In the case that the first electronic device inputs a voice by a voice software, the user's mouth needs to be close to the electronic device, thus clear voice information is collected by the electronic device.

II. The second distance h2 is within a predetermined range of distance. Specifically, the predetermined range of distance may be a range of distance adapted to collect the voice information by the first electronic device. For example, the predetermined range of distance may be ranged from 0 cm to 20 cm, if the first electronic device can collect full voice information within a radius of 20 cm.

Figure 3:
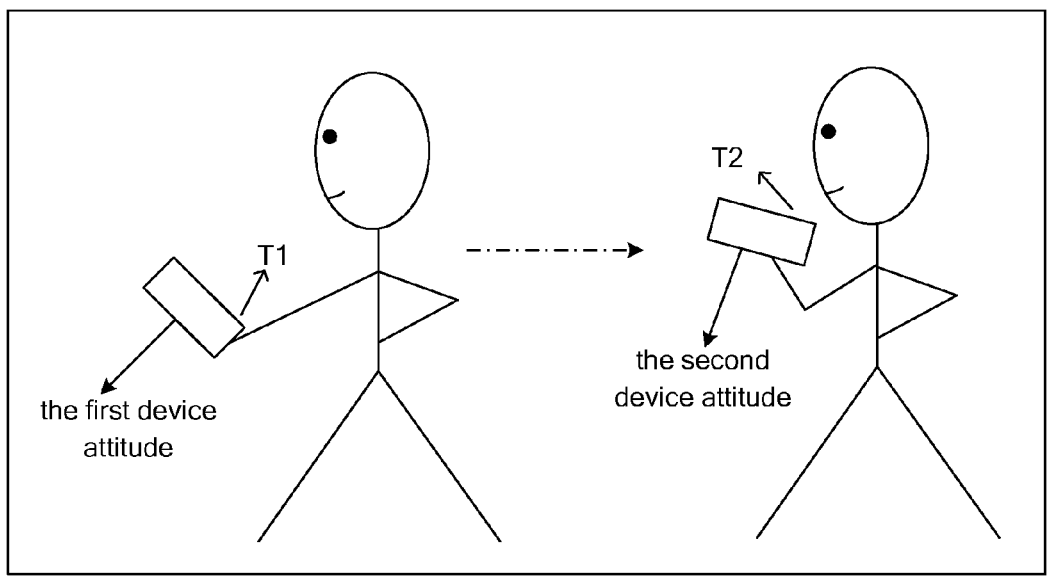
FIG. 3 is a schematic diagram in the case that a second device orientation meets a predetermined condition III according to the first embodiment of the present application.

III. Referring to FIG. 3, a second temperature value T2 of a second environment around a first electronic device in the second device orientation is larger than a first temperature value T1 of a first environment around a first electronic device in the first device orientation. In the case of using a function of voice input, the distance between the first electronic device and a user decreases and the thermal radiation may be enhanced, and the airflow generated by tentative pronunciation may increase the temperature of the environment of the voice device.

IV. The second temperature value T2 is within a predetermined range of temperature. Specifically, the predetermined range of temperature may be a range of temperature of the environment around the first electronic device, for example, may be ranged from 28 Celsius degree to 32 Celsius degree, which is obtained according to the experimental data in the case that a user outputs a voice to the first electronic device.

Figure 4:
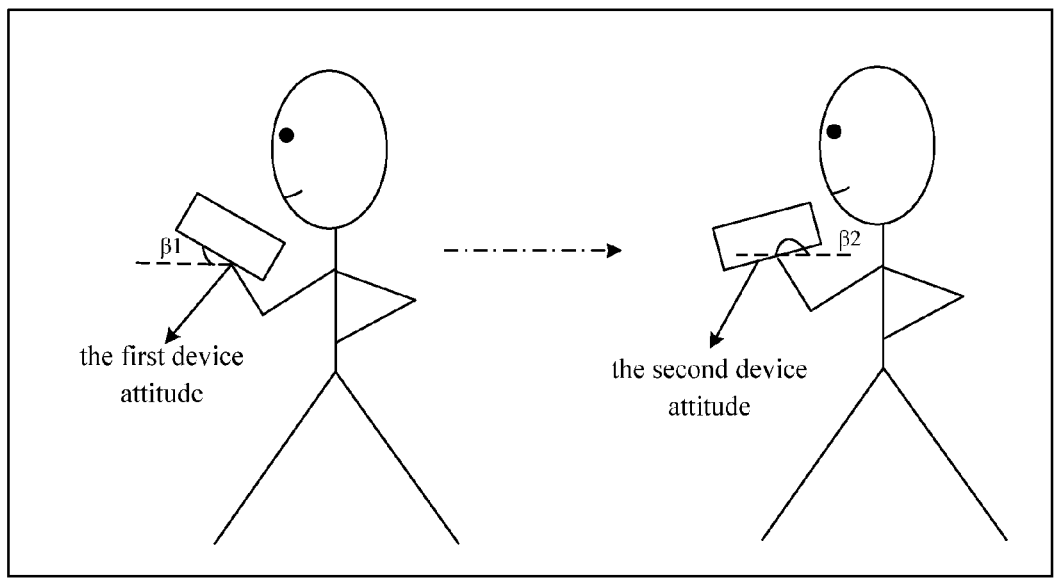
FIG. 4 is a schematic diagram in the case that a second device orientation meets a predetermined condition V according to the first embodiment of the present application.

V. Referring to FIG. 4, a second angle value β2 of a first electronic device in a second device orientation with respect to a predetermined plane is larger than a first angle value β1 of the first electronic device in a first device orientation with respect to the predetermined plane. Specifically, the predetermined plane may be a horizontal plane. Generally, because the voice collection unit of the first electronic device tends to be arranged on one end of the electronic device, the electronic device is inclined in the case that a user uses the voice collection function by normally facing to an end of the electronic device where the voice collection unit is located.

VI. The second angle value β2 is within a predetermined range of angle. Specifically, the predetermined range of angle may be predefined according to the shape of the first electronic device. For example, the predetermined range of angle may be predefined to be a range of 0 degree to 60 degree in the case that the first electronic device is a rectangular cell phone and the microphone of the cell phone is located in the bottom right part of the cell phone.

There are several predetermined conditions which are consisted of the above conditions. In order to describe clearly the process for determining whether the second device orientation meets the predetermined condition and obtaining a second determination, the following cases will be specifically described according to the embodiments.

The first case: the predetermined condition is predefined as I, that is, a second distance h2 between a first electronic device in a second device orientation and a reference plane is less than a first distance h1 between the first electronic device in a first device orientation and the reference plane, in this case, there are two steps for determining whether the second device orientation meets the predetermined condition.

Step 1 is to obtain a second distance h2 between the first electronic device and a reference plane in the case that the device orientation is the second device orientation, and obtain a first distance h1 between the first electronic device and the reference plane in the case that the device orientation is the first device orientation. Specifically, the second distance and the first distance may be detected at a first time instant and a second time instant by a distance sensor, respectively.

Step 2 is to determine whether the second distance h2 is less than the first distance h1 and obtain the second determination. There are two cases: first, if the second distance h2 is less than the first distance h1, it is indicated that the second device orientation meets the predetermined condition; second, if the second distance h2 is larger than or equal to the first distance h1, it is indicated that the second device orientation does not meet the predetermined condition.

For example, assuming that the reference plane is the plane of the user's chin, by a distance sensor, the second distance between the first electronic device in the second device orientation and the plane of the user's chin is detected to be 5 cm, and the first distance between the first electronic device in the first device orientation and the plane of the user's chin is detected to be 25 cm. Then, it is determined that the second distance of 5 cm is less than the first distance of 20 cm. Therefore, the obtained second determination indicates that the second device orientation meets the predetermined condition. That is, the second device orientation is adjusted to a voice device orientation. As a result, a first instruction for starting a first voice software is generated by the first electronic device such that the first voice software can be started automatically.

The second case: in order to avoid the case that a user only changes the position of the first electronic device optionally, for example, the user changes to another posture after holding a cell-phone in one posture for a long time. In this case, a second distance may be decreased while the user doesn't need to use the voice software. Consequently, the predetermined condition may be defined as I and II as follows to accurately determine whether the user need to start a first voice software and improve the accuracy of starting the first voice software: the second distance h2 is less the first distance h1 and the second distance h2 is within a predetermined range of distance. In this case, there are three steps for determining whether the second device orientation meets the predetermined condition.

Step 1 is to obtain a second distance h2 between the first electronic device and a reference plane in the case that the device orientation is the second device orientation, and obtain a first distance h1 between the first electronic device and the reference plane in the case that the device orientation is the first device orientation.

Step 2 is to determine whether the second distance h2 is less than the first distance h1 and obtain a third determination. If the third determination indicates the second distance h2 is larger than or equal to the first distance h1, the final determination indicating that the second device orientation does not meet the predetermined condition is directly obtained, and the process is terminated; if the third determination indicates the second distance h2 is less than the first distance h1, step 3 is continuously performed.

Step 3 is to determine whether the second distance h2 is within a predetermined range of distance and obtain the final determination if the third determination indicates that the second distance h2 is less than the first distance h1. If the second distance h2 is within the predetermined range of distance, the final determination is that the second device orientation meets the predetermined condition. In contrast, if the second distance h2 is not within the predetermined range of distance, the final determination is that the second device orientation does not meet the predetermined condition.

For example, assuming that the obtained second distance is 5 cm, the obtained first distance is 25 cm, and the predetermined range of distance is ranged from 0 cm to 20 cm, it is detected that the second distance of 5 cm is less than the first distance of 25 cm, and it is further determined that the second distance of 5 cm is within the predetermined distance ranged from 0 cm to 20 cm. Therefore, because the second determination indicates that the second distance of 5 cm is within the predetermined distance ranged from 0 cm to 20 cm, it is indicated that the second device orientation meets the predetermined condition. In this case, a first instruction is generated by the first electronic device to start the first voice software automatically.

The third case: similarly, in order to improve the accuracy in starting a first voice software, the predetermined condition may be defined as I and III, that is, the second distance h2 is less than the first distance h1 and the second temperature value T2 is larger than the first temperature value T1. In this case, the step of determining whether the second device orientation meets the predetermined condition specifically includes the following four steps.

Step 1 is to obtain a second distance h2 between the first electronic device and a reference plane when the device orientation is the second device orientation, and obtain a first distance h1 between the first electronic device and the reference plane when the device orientation is the first device orientation.

Step 2 is to obtain a second temperature value T2 of a second environment around the first electronic device in the case that the device orientation is the second device orientation, and obtain a first temperature value T1 of a first environment around the first electronic device in the case that the device orientation is the first device orientation. Specifically, the second temperature value and the first temperature value may be obtained by an infrared temperature sensor.

Step 3 is to determine whether the second distance h2 is less than the first distance h1 and obtain a fourth determination result. If the forth determination result indicates that the second distance h2 is larger than the first distance h1, a final determination result indicating that the second device orientation does not meet the predetermined condition is directly obtained and the process is terminated; if the forth determination result indicates that the second distance h2 is less than the first distance h1, step 4 is continuingly performed.

Step 4 is to determine whether the second temperature value T2 is larger than the first temperature value T1 and obtain the final determination result, if the forth determination result indicates that the second distance h2 is less than the first distance h1. If the second temperature value T2 is less than the first temperature value T1, the final determination result is that the second device orientation meets the predetermined condition; conversely, if the second temperature value T2 is equal to or less than the first temperature value T1, the final determination result is that the second device orientation doesn't meet the predetermined condition.

For example, a second distance of 10 cm and a first distance of 15 cm are obtained; a second temperature value of 25 centigrade and a first temperature value of 26 centigrade are obtained; next, the magnitude of the first distance and the second distance are compared, and an obtained determination result is that the second distance value of 10 cm is less than the first distance value of 15 cm; after that, the first temperature value and the second temperature value are continually compared, and an obtained determination result is that the second temperature value of 25 centigrade is less than the first temperature value of 26 centigrade. Consequently, the obtained second determination result indicates that the second device orientation does not meet the predetermined condition, so the first voice software is not started at this time.

The forth case: similarly, in order to improve the accuracy in starting the first voice software, the predetermined condition may be defined as I and V, that is, the second distance h2 is less than the first distance h1 and the second angle value β2 is larger than the first angle value β1, in this case, the step of determining whether the second device orientation meets the predetermined condition specifically includes the following four steps.

Step 1 is to obtain a second distance h2 between the first electronic device and a reference plane in the case that the device orientation is the second device orientation, and obtain a first distance h1 between the first electronic device and the reference plane in the case that the device orientation is the first device orientation.

Step 2 is to obtain a second angle value β2 of the first electronic device with respect to a predetermined plane in the case that the device orientation is in the second device orientation; and obtain the first angle value β1 of the first electronic device with respect to the predetermined plane in the case that the device orientation is in the first device orientation. Specifically, the second angle value and the first angle value may be obtained by a gravity sensor.

Step 3 is to determine whether the second distance h2 is less than the first distance h1, and obtain the fifth determination result. If the fifth determination result indicates that the second distance h2 is larger than or equal to the first distance h1, a final determination result indicating that the second device orientation does not meet the predetermined condition is directly obtained, and the process is terminated; if the fifth determination result indicates that the second distance h2 is less than the first distance h1, step 4 is continuingly performed.

Step 4 is to determine whether the second angle value β2 is larger than the first angle value β1 and obtain the final determination result, if the fifth determination result indicates that the second distance h2 is less than the first distance h1, If the second angle value β2 is larger than the first angle value β1, the final determination result is that the second device orientation meets the predetermined condition; conversely, if the second angle value β2 is less than or equal to the first angle value β1, the final determination result is that the second device orientation does not meet the predetermined condition.

For example, a second distance of 8 cm and a first distance of 20 cm are obtained in step 1; a second angle value of 10 degree and a first angle value of 0 degree are obtained in step 2; it is determined in step3 that whether the first distance is less than the second distance, and an obtained determination result is that the second distance of 8 cm is less than the first distance of 20 cm; and it is continuously determined in step4 that whether the second angle value is less than the first angle value, and an obtained determination result is that the second angle value of 10 degree is larger than the first angle value of 0 degree. As a result, the obtained second determination result indicates that the second device orientation meets the predetermined condition, so a first instruction for staring the first voice software is generated at this time.

The fifth case: whether the second device orientation enters into a voice device orientation can also be determined according to the environment temperature around the second device in addition to the second distance h2 and the first distance h1. In this case, the predetermined condition may be defined as III and IV, that is, a second temperature value T2 is larger than a first temperature value T1 and a second temperature value T2 meets a predetermined range of temperature. In this case, the step of determining whether the second device orientation meets the predetermined condition specifically includes the following steps.

Step 1 is to obtain a second temperature value T2 of a second environment around the first electronic device in the case that the device orientation is the second device orientation; and obtain a first temperature value T1 around a first environment of the first electronic device in the case that the device orientation is the first device orientation.

Step 2 is to determine whether the second temperature value T2 is larger than the first temperature value T1 and obtain a sixth determination result. If the sixth determination result indicates that second temperature value T2 is less than or equal to a first temperature value T1, a final determination result indicating that the second device orientation does not meet the predetermined condition is directly obtained, and the process is terminated; if the sixth determination result indicates that the second temperature value T2 is larger than the first temperature value T1, the sixth step is continuingly preformed.

Step 3 is to determine whether the second temperature value T2 is within a predetermined range of temperature and obtain a final determination result, if the sixth determination result indicates that the second temperature value T2 is larger than the first temperature value T1. If the second temperature value T2 is within the predetermined range of temperature, the final determination result is that the second device orientation meets the predetermined condition; conversely, if the second temperature value T2 is not within the predetermined range of temperature, the final determination result is that a second device orientation does not meet the predetermined condition.

For example, a second temperature value of 29 centigrade and a first temperature value of 22 centigrade are obtained in step1; it is determined in step 2 that whether the second temperature value is larger than the first temperature value, and an obtained determination result is that the second temperature value of 29 centigrade is larger than the first temperature value of 22 centigrade in step2; next, it is determine that whether a second temperature value is within a predetermined range of temperature, and by assuming the predetermined temperature is ranged from 28 centigrade to 32 centigrade, an obtained determination result is that the second temperature of 29 centigrade is within the predetermined temperature ranged from 28 centigrade to 32 centigrade. As a result, the second determination result indicating the second device orientation meets the predetermined condition is obtained, which indicates that a voice software is required by a user at this time, so a first instruction for starting the first voice software is generated.

The sixth case: determining whether the second device orientation is changed into a voice device orientation may be further determined based on the angle of the first electronic device with respect to the predetermined plane in addition to the temperature of the circumstance where the first electronic device is located. Therefore the predetermined condition may also be defined as V and VI, that is, the second angle value β2 of the first electronic device is larger than the first angle value β1 and the second angle value β2 is within a predetermined range of angle. In the case that the predetermined condition is defined as V and VI, the step of determining whether the second device orientation meets a predetermined condition and obtaining a second determination result includes Step 1 to Step 3.

Step 1 is to obtain a second angle value β2 of the first electronic device with respect to a predetermined plane in the case that the device orientation is the second device orientation, and obtain a first angle value β1 of the first electronic device with respect to the predetermined plane in the case that the device orientation is the first device orientation.

Step 2 is to determine whether the second angle value β2 is larger than the first angle value β1 and obtain a seventh determination result. The seventh determination result includes two cases. In the first case that the second angle value β2 is less than or equal to the first angle value β1, a final determination result indicating that the second device orientation does not meet the predetermined condition is directly obtained, and the process is terminated. In the second case where the second angle value β2 is larger than the first angle value β1, step 3 is performed.

Step 3 is to determine whether the second angle value β2 is within the predetermined range of angle and obtain a final determination result, if the seventh determination result indicates that the second angle value β2 is larger than the first angle value β1. The final determination result is that the second device orientation meets the predetermined condition, if the second angle value β2 is within the predetermined range of angle. On the other hand, the final determination result is that the second device orientation does not meet the predetermined condition if the second angle value β2 is not within the predetermined range of angle.

For example, the second angle value is obtained to be 90 degree and the first angle value is obtained to be 60 degree in step 1. It is determined that whether the second angle value is larger than the first angle value in step 2, and the determination result is made that the second angle value of 90 degree is larger than the first angle value of 60 degree. Step 3 is continuously performed to determine whether the second angle value meets the predetermined range of angle. Assuming that the predetermined range of angle is ranged from 0 degree to 60 degree, a determination result is made that the second angle value of 90 degree is not within the predetermined range of angle. As a result, the second determination result indicating that the second device orientation does not meet the predetermined condition is obtained, that is, the second device orientation is not the voice device orientation in the case that the user uses a voice software, therefore a first voice software is not started.

Those skilled in the art may clearly understand specific implementations of determining whether the second device orientation meets the predetermined condition of the voice device orientation in different predetermined conditions according to the six cases. The step of determining whether the second device orientation meets the voice device orientation in predetermined conditions other than the six cases is not described herein in detail.

In the method according to the application, the predetermined condition may be a factory default setting of the electronic device, or a personalized predetermined condition defined by the user in conjunction with the using habits and the definition items defined by the electronic device.

Figure 5:
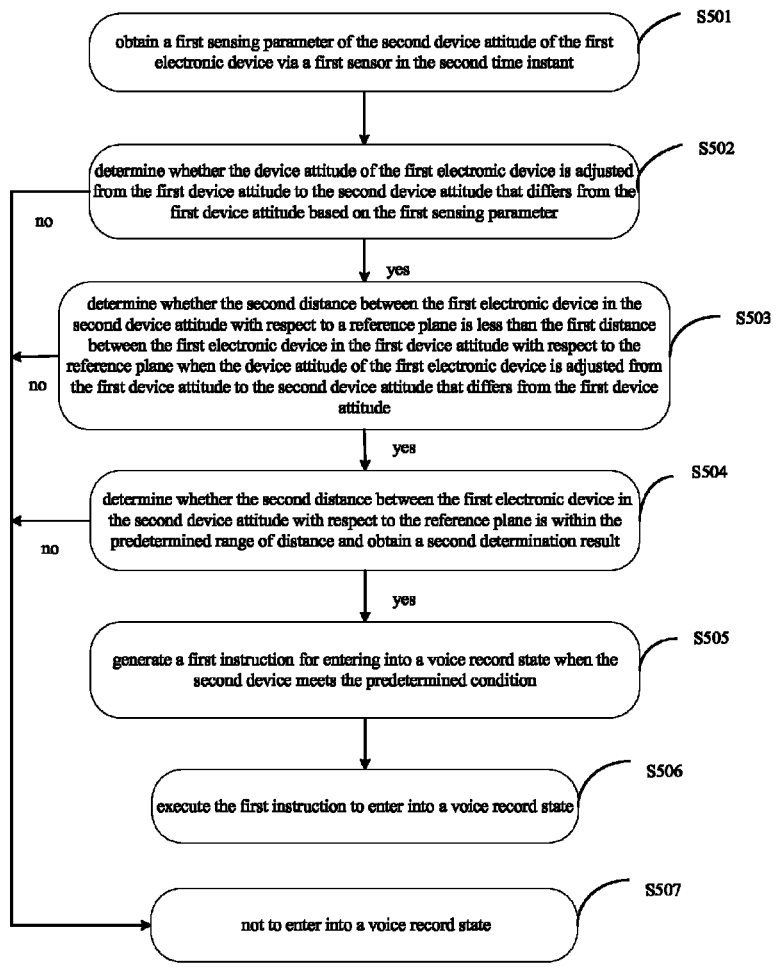
FIG. 5 is a diagram of specific implementation steps of a method for starting a first voice software according to the first embodiment of the present application.

The complete steps of starting a first voice software according to the application is described with a specific embodiment. Reference is made to FIG. 5, assuming that the first electronic device is a mobile phone installed with a first voice software, the first sensor is a gravity sensor, and the predetermined condition to be met by the voice device orientation of the mobile phone is that a second distance between the mobile phone in a second device orientation and a plane of the user's chin is less than a first distance between the mobile phone in the first device orientation and the plane of the user's chin, and the second distance meets the predetermined distance ranged from 0 cm to 15 cm, the steps to initiate the voice software are from S501 to S505.

S501 is to obtain a first sensing parameter of the second device orientation of the first electronic device via a first sensor at a second time instant. The first sensing parameter detected by the gravity sensor is a second angle value of 22 degree of the mobile phone with respect to the horizontal plane at the second time instant.

S502 is to determine whether the device orientation of the first electronic device is adjusted from the first device orientation to the second device orientation that differs from the first device orientation based on the first sensing parameter. S507 is performed not to enter into a voice record state if the device orientation of the first electronic device is not adjusted from the first device orientation to the second device orientation that differs from the first device orientation. S503 is performed if the device orientation of the first electronic device is adjusted from the first device orientation to the second device orientation that differs from the first device orientation.

For example, a first angle value of 5 degree stored by the mobile phone in the first time instant and obtained via the gravity sensor is called to determine that the second angle value of 22 degree differs from the first angle value of 5 degree. A first determination result indicating that the device orientation of the mobile phone is adjusted from the first device orientation to the second device orientation that differs from the first device orientation is obtained, and then the next step is performed.

S503 is to determine whether the second distance between the first electronic device in the second device orientation with respect to a reference plane is less than the first distance between the first electronic device in the first device orientation with respect to the reference plane, if the device orientation of the first electronic device is adjusted from the first device orientation to the second device orientation that differs from the first device orientation. S507 is performed to not enter into a voice record state if the second distance is not less than the first distance. S504 is performed if the second distance is less than the first distance.

For example, a second distance of 8 cm is obtained via the distance sensor and a first distance of 20 cm stored in the mobile phone is obtained via the distance sensor. It is determined that the second distance of 8 cm is less than the first distance of 20 cm. In this case, the next step is performed.

S504 is to determine whether the second distance between the first electronic device in the second device orientation with respect to the reference plane is within the predetermined range of distance. S507 is performed to not enter into a voice record state if the second distance is not within the predetermined range of distance. S505 is performed to enter a voice record state if the second distance is within the predetermined range of distance.

For example, it is determined whether the second distance of 8 cm is within the predetermined distance ranged from 0 cm to 15 cm, and a determination result obtained is that the second distance of 8 cm is within the predetermined distance ranged from 0 cm to 15 cm. So the obtained second determination result is that the second device orientation meets the predetermined condition. In this case, the next step S505 is performed.

S505 is to generate a first instruction for entering into a voice record state when the second device meets the predetermined condition. Since the first voice software having a voice recording function is installed in the first electronic device, i.e., the mobile phone, the first generated instruction is a first starting instruction to start the first voice software. And finally S506 is performed.

S506 is to execute the first instruction to enter into a voice record state and perform voice recording.

In practical application, to provide the user with a more intelligent user experience, whether there is voice input external to the first electronic device or the second electronic device is detected and a first detection result is obtained at any predetermined time period. Specifically, the predetermined time period may be a time period starting from any time instant after initiating the first voice software with a duration of 2 minutes or 3 minutes. The electronic device is kept in the voice record state if the first detection result indicates that there is a voice input. On the other hand, a second instruction for exiting from the voice record state is generated if the first detection result indicates that there is no voice input in the predetermined time period, such that the first electronic device or the second electronic device exit from the voice record state.

In the above embodiment, a first sensing parameter of the first electronic device in the second device orientation is detected by a sensor, based on the first sensing parameter whether the device orientation of the first electronic device changes is determined. In the case that the device orientation of the first electronic device changes and the changed second device orientation meets the predetermined condition, it is indicated that the first electronic device is changed into a voice device orientation, representing that a user needs the electronic device to enter into the voice record state automatically to perform a voice recording. In this case, the electronic device enters into the voice record state automatically. Thus, it is avoided that the user looks for the first voice software among a large amount of applications in the electronic device and then manually starts the first voice software and clicks the voice recording button. Thus the technical issue that the operation for entering into the voice record state is complicate in the electronic device in the existing technologies is addressed and the technical effect of rapidly performing voice recording is achieved.

Furthermore, the present application provides to the user multiple modes for rapidly entering into the voice record state. For example, entering into the voice record state is triggered by detecting a distance change between the first electronic device and the reference plane, or by changing the angle of the electronic device, or by changing the temperature outside the electronic device. Therefore, the user may start the voice recording function by selecting any one of the above modes according to their requirements or habits to trigger the device to enter into the voice record state and perform the voice recording, rather than being limited to touch-controlling a shortcut icon. In addition, the mode for entering into the voice recording provided by the present application more conforms to a nature action for the performing the voice recording, such as making the electronic device close to the mouth by changing the distance to the electronic device, resulting in a more intelligent technical effect and a better user experience.

In the present application, in the case that the electronic device is in the voice record state, whether there is voice information input or output is further detected in a predetermined time period to determine whether the user is still using the voice recording function. If the voice information input or output is not detected in the predetermined time period, it is indicated that the user is not using the voice recording function, and the electronic device exits from the voice record state automatically. Thus the waste of resources for maintaining the voice record state is reduced effectively.

Second Embodiment

Figure 6:
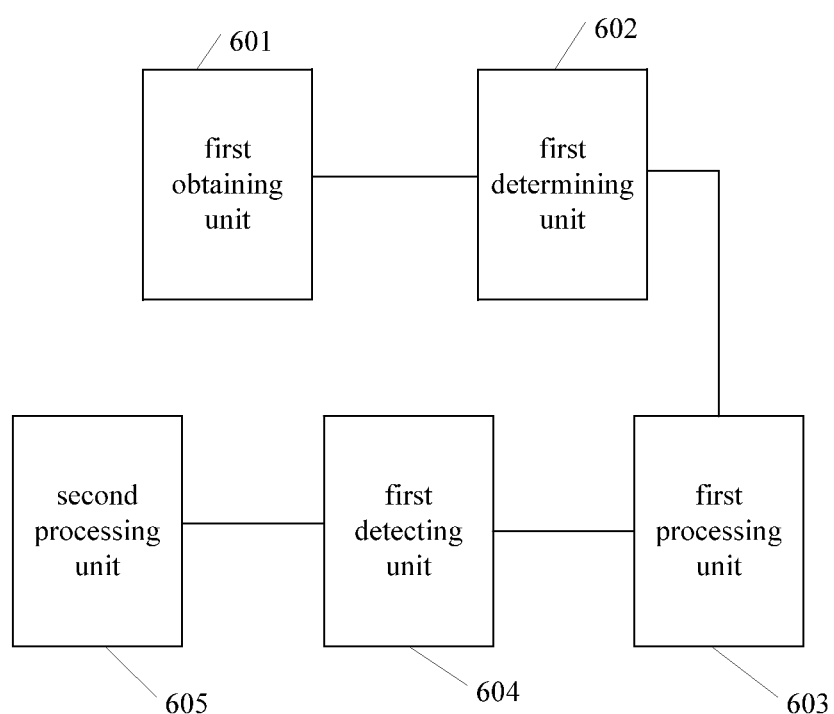
FIG. 6 is a structural block diagram of an electronic device according to a second embodiment of the present application.

Referring to FIG. 6, an electronic device according to the embodiment includes:

a first obtaining unit 601, configured to obtain, by a first sensor of the electronic device, a sensing parameter indicating that the device orientation is a second device orientation at a second time instance posterior to the first time instance in the case that the device orientation of the electronic device is a first device orientation at a first time instance;

a first determining unit 602, configured to determine, based on the first sensing parameter, whether the device orientation is adjusted from the first device orientation to the second device orientation that differs from the first device orientation, and obtain a first determination; and a first processing unit 603, configured to generate a first instruction for entering into a voice record state to enable the electronic device or a second electronic device that differs from the electronic device to enter into the voice record state in response to the first instruction in the case that the first determination indicates that the device orientation is adjusted from the first device orientation to the second device orientation and the second device orientation meets a predetermined condition.

To obtain a better second determination, the first processing unit 603 includes:

a first determining module, configured to determine whether the second device orientation meets a predetermined condition and obtain a second determination, if the first determination indicates that the device orientation is adjusted from the first device orientation to the second device orientation; and a first generating module, configured to generate the first instruction for entering into the voice record state if the second determination indicates that the second device orientation meets the predetermined condition.

In practical application, in order to obtain the second determination based on the predetermined condition, the first determining module includes:

a first obtaining sub-module, configured to obtain a second distance between the electronic device and a reference plane in the case that the device orientation is the second device orientation, and obtain a first distance between the electronic device and the reference plane in the case that the device orientation is the first device orientation; and a first determining sub-module, configured to determine whether the second distance is less than the first distance and obtain the second determination;

if the second determination indicates that the second distance is less than the first distance, it is indicated that the second device orientation meets the predetermined condition.

In practical application, in order to obtain more accurately the second determination, the first determining module includes:

a second obtaining sub-module, configured to obtain a second distance between the electronic device and a reference plane in the case that the device orientation is the second device orientation, and obtain a first distance between the electronic device and the reference plane in the case that the device orientation is the first device orientation;

a second determining sub-module, configured to determine whether the second distance is less than the first distance, and obtain a third determination; and a third determining sub-module, configured to determine whether the second distance is within a predetermined range of distance and obtain the second determination, if the third determination indicates that the second distance is less than the first distance;

if the second determination indicates that the second distance is within the predetermined range of distance, it is indicated that the second device orientation meets the predetermined condition.

Specifically, in the case that the second determination is obtained base on a temperature value of a environment around the first electronic device, the first determining module includes:

a third obtaining sub-module, configured to obtain a second distance between the electronic device and a reference plane in the case that the device orientation is the second device orientation, and obtain a first distance between the electronic device and the reference plane in the case that the device orientation is the first device orientation;

a fourth obtaining sub-module, configured to obtain a second temperature value of a second environment around the electronic device in the case that the device orientation is the second device orientation, and obtain a first temperature value of a first environment around the electronic device in the case that the device orientation is the first device orientation;

a fourth determining sub-module, configured to determine whether the second distance is less than the first distance and obtain a fourth determination; and a fifth determining sub-module, configured to determine whether the second temperature value is larger than the first temperature value and obtain the second determination, if the fourth determination indicates that the second distance is less than the first distance;

if the second determination indicates that the second temperature value is larger than the first temperature value, it is indicated that the second device orientation meets the predetermined condition.

In practice, in the case that the second determination is obtained base on a distance value and an angle value, the first determining module includes:

a fifth obtaining sub-module, configured to obtain a second distance between the electronic device and a reference plane in the case that the device orientation is the second device orientation, and obtain a first distance between the electronic device and the reference plane in the case that the device orientation is the first device orientation;

a sixth obtaining sub-module, configured to obtain a second angle value of the electronic device with respect to a predetermined plane in the case that the device orientation is the second device orientation, and obtain a first angle value of the electronic device with respect to the predetermined plane in the case that the device orientation is the first device orientation;

a sixth determining sub-module, configured to determine whether the second distance is less than the first distance and obtain a fifth determination; and a seventh determining sub-module, configured to determine whether the second angle value is larger than the first angle value and obtaining the second determination, if the fifth determination indicates that the second distance is less than the first distance;

if the second determination indicates that the second angle value is larger than the first angle value, it is indicated that the second device orientation meets the predetermined condition.

In practical application, in the case that the second determination is obtained base on a predetermined range of temperature value, the first determining module includes:

a seventh obtaining sub-module, configured to obtain a second temperature value of a second environment around the electronic device in the case that the device orientation is the second device orientation, and obtain a first temperature value of a first environment around the electronic device in the case that the device orientation is the first device orientation;

an eighth determining sub-module, configured to determine whether the second temperature value is larger than the first temperature value and obtain a sixth determination; and a ninth determining sub-module, configured to determine whether the second temperature value is within a predetermined range of temperature and obtain the second determination, if the sixth determination indicates that the second temperature value is larger than the first temperature value;

if the second determination indicates that the second temperature value is within the predetermined range of temperature, it is indicated that the second device orientation meets the predetermined condition.

In practical application, in the case that the second determination is obtained base on a predetermined range of angle value, the first determining module includes:

an eighth obtaining sub-module, configured to obtain a second angle value of the electronic device with respect to a predetermined plane in the case that the device orientation is the second device orientation, and obtain a first angle value of the electronic device with respect to the predetermined plane in the case that the device orientation is the first device orientation;

a tenth determining sub-module, configured to determine whether the second angle value is larger than the first angle value and obtain a seventh determination; and a eleventh determining sub-module, configured to determine whether the second angle value is within a predetermined range of angle and obtain the second determination, if the seventh determination indicates that the second angle value is larger than the first angle value;

if the second determination indicates that the second angle value is within the predetermined range of angle, it is indicated that the second device orientation meets the predetermined condition.

In order to stop the first voice software in the case that the first voice software is not being used, thereby reducing a waste of resources, the electronic device further includes:

a first detecting unit 604, configured to detect whether there is a voice input from outside of the electronic device or the second electronic device during a predetermined time period and obtain a first detection result; and a second processing unit 605, configured to generate a second instruction for exiting from the voice record state and exit from the voice record state by the second instruction, if the first detection result indicates that there is no voice input during the predetermined time.

In practical application, in the case that the electronic device has a voice recording function, the first generating module is configured to:

generate a first starting instruction for entering into the voice record state, and enable the electronic device to enter into the voice record state to record outer voice by executing the first starting instruction.

In practical application, in the case that the electronic device does not have a voice recording function, the first generating module is configured to:

generate a first control instruction for entering into the voice record state, enable the electronic device to generate a second starting instruction by executing the first control instruction, and then enter into the voice record state to record outer voice by executing the second starting instruction.

The operation of the electronic device is not described in detail herein, because the electronic device of the embodiment is a virtual device corresponding to the information processing method.

One or more technical effects as follows may be achieved through one or more technical schemes in the embodiments of the present application.

First, in the present application, a first sensing parameter of the first electronic device in the second device orientation is detected by a sensor, based on the first sensing parameter whether the device orientation of the first electronic device changes is determined. In the case that the device orientation of the first electronic device changes and the changed second device orientation meets the predetermined condition, it is indicated that the first electronic device is changed into a voice device orientation, representing that a user needs the electronic device to enter into the voice record state automatically to perform a voice recording. In this case, the electronic device enters into the voice record state automatically. Thus, it is avoided that the user looks for the first voice software among a large amount of applications in the electronic device and then manually starts the first voice software and clicks the voice recording button. Thus the technical issue that the operation for entering into the voice record state is complicate in the electronic device in the conventional technology is addressed and the technical effect of rapidly performing voice recording is achieved.

Second, the present application provides to the user multiple modes for rapidly entering into the voice record state. For example, entering into the voice record state is triggered by detecting a distance change between the first electronic device and the reference plane, or by changing the angle of the electronic device, or by changing the temperature outside the electronic device. Therefore, the user may start the voice recording function by selecting any one of the above modes according to their requirements or habits to trigger the device to enter into the voice record state and perform the voice recording, rather than being limited to touch-controlling a shortcut icon. In addition, the mode for entering into the voice recording provided by the present application more conforms to a nature action for the performing the voice recording, such as making the electronic device close to the mouth by changing the distance to the electronic device, resulting in a more intelligent technical effect and a better user experience.

Third, in the present application, in the case that the electronic device is in the voice record state, whether there is voice information input or output is further detected in a predetermined time period to determine whether the user is still using the voice recording function. If the voice information input or output is not detected in the predetermined time period, it is indicated that the user is not using the voice recording function, and the electronic device exits from the voice record state automatically. Thus the waste of resources for maintaining the voice record state is reduced effectively.

The description in this application is made in conjunction with flowchart(s) and/or block diagram(s) of the method, device (system) or computer program product according to the embodiments of the application. It should be understood that each process in the flowchart and/or each block in the block diagram and any combination of processes and/or blocks in the flowchart and/or the block diagram may be implemented through computer program instructions. The computer instructions may be provided to a processor of a general-purpose computer, dedicated computer, embedded processing machine or any other programmable data processing device to generate a machine, in which device(s) to implement functions specified in one or more processes of the flowchart and/or one or more blocks of the block diagram are implemented through executing the instructions by the computer or any other programmable data processing device.

The computer program instructions may further be stored in a computer readable storage which may lead the computer or any other programmable data processing device to operation in particular manner in order that a product including an instruction device is generated according to the instructions stored in the computer readable storage, where the instruction device is configured to implement the functions specified in one or more processes of the flowchart.

The computer program instructions may further be loaded to the computer or any other programmable data processing device in order that a series of steps are executed on the computer or any other programmable data processing device to generate processes implemented by the computer, and the steps to implement the functions specified in one or more processes of the flowchart and/or one or more blocks of the block diagram are provided by the instructions executed on the computer or any other programmable data processing device.

Apparently, various modifications and variations may be made by those skilled in the art without deviating from the spirit and scope of the present application. Therefore, if the modifications and variations fall within the scope of the claims and equivalent techniques of the present application, the present application is intended to include the modifications and variations.

The invention claimed is:

1. An information processing method applied to a first electronic device, wherein, when a device orientation of the first electronic device is a first device orientation at a first time instant, the information processing method comprises:
   obtaining, by a first sensor of the first electronic device, a first sensing parameter indicating that the device orientation is a second device orientation at a second time instant posterior to the first time instant;
   determining, based on the first sensing parameter, whether the device orientation is adjusted from the first device orientation to the second device orientation that differs from the first device orientation;
   in response to the device orientation being adjusted from the first device orientation to the second device orientation: (i) obtaining a first temperature value of a first environment around the first electronic device when the device orientation is the first device orientation, and (ii) obtaining a second temperature value of a second environment around the first electronic device when the device orientation is the second device orientation;
   in response to the second device orientation meeting a predetermined condition, determining whether the second temperature value is within a first predetermined range of temperature values and is different from the first temperature;
   in response to the second temperature being within the first predetermined range of temperature values and being different from the first temperature, generating a first instruction for entering into a voice record state; and
   in response to the first instruction being generated, enabling the first electronic device or a second electronic device to enter into the voice record state, wherein the second electronic device differs from the first electronic device and is connected to the first electronic device.

2. The method according to claim 1, wherein the step of generating the first instruction for entering into the voice record state comprises:
   determining whether the second device orientation meets a predetermined condition in response to the device orientation being adjusted from the first device orientation to the second device orientation; and
   generating the first instruction for entering into the voice record state when the second device orientation meets the predetermined condition.

3. The method according to claim 2, wherein the step of determining whether the second device orientation meets the predetermined condition comprises:
   obtaining a second distance between the first electronic device and a reference plane when the device orientation is the second device orientation, and obtaining a first distance between the first electronic device and the reference plane when the device orientation is the first device orientation;
   determining whether the second distance is less than the first distance; and
   in response to the second distance being less than the first distance, determining whether the second device orientation meets the predetermined condition.

4. The method according to claim 2, wherein the step of determining whether the second device orientation meets the predetermined condition comprises:
   obtaining a second distance between the first electronic device and a reference plane when the device orientation is the second device orientation, and obtaining a first distance between the first electronic device and the reference plane when the device orientation is the first device orientation;
   determining whether the second distance is less than the first distance;
   in response to the second distance being less than the first distance, determining whether the second distance is within a predetermined range of distance; and
   in response to the second distance being within the predetermined range of distance, indicating that the second device orientation meets the predetermined condition.

5. The method according to claim 1, wherein the step of determining whether the second temperature value is within the first predetermined range of temperature values comprises:
   obtaining a second distance between the first electronic device and a reference plane when the device orientation is the second device orientation;
   obtaining a first distance between the first electronic device and the reference plane when the device orientation is the first device orientation;
   determining whether the second distance is less than the first distance;
   in response to the second distance being less than the first distance, determining whether the second temperature value is larger than the first temperature value; and
   in response to the second temperature value being larger than the first temperature value, indicating that the second temperature value is within the first predetermined range of temperature values.

6. The method according to claim 2, wherein the step of determining whether the second device orientation meets the predetermined condition comprises:
   obtaining a second distance between the first electronic device and a reference plane when the device orientation is the second device orientation;
   obtaining a first distance between the first electronic device and the reference plane when the device orientation is the first device orientation;
   obtaining a second angle value of the first electronic device with respect to the reference plane when the device orientation is the second device orientation;
   obtaining a first angle value of the first electronic device with respect to the reference plane when the device orientation is the first device orientation;
   determining whether the second distance is less than the first distance;
   in response to the second distance being less than the first distance, determining whether the second angle value is larger than the first angle value; and in response to the second angle value being larger than the first angle value, indicating that the second device orientation meets the predetermined condition.

7. The method according to claim 1, wherein the step of determining whether the second temperature value is within the first predetermined range of temperature values comprises:
   determining whether the second temperature value is larger than the first temperature value;
   in response to the second temperature value being larger than the first temperature value, determining whether the second temperature value is within a second predetermined range of temperature; and
   in response to the second temperature value being within the second predetermined range of temperature, indicating that the second temperature value is within the first predetermined range of temperature values.

8. The method according to claim 2, wherein the step of determining whether the second device orientation meets the predetermined condition comprises:
   obtaining a second angle value of the first electronic device with respect to a reference plane when the device orientation is the second device orientation;
   obtaining a first angle value of the first electronic device with respect to the reference plane when the device orientation is the first device orientation;
   determining whether the second angle value is larger than the first angle value;
   in response to the second angle value being larger than the first angle value, determining whether the second angle value is within a predetermined range of angle; and
   in response to the second angle value being within the predetermined range of angle, indicating that the second device orientation meets the predetermined condition.

9. The method according to claim 1, wherein, after generating the first instruction for entering into the voice record state, the method further comprises:
   detecting whether there is voice input from outside of the first electronic device or the second electronic device during a predetermined time period and obtaining a first detection result; and
   in response to the first detection result indicating that there is no voice input during the predetermined time, generating a second instruction for exiting from the voice record state.

10. The method according to claim 9, wherein, when the first electronic device has a voice recording function, the step of generating the first instruction for entering into the voice record state comprises:
    generating a first starting instruction for entering into the voice record state, to enable the first electronic device to enter into the voice record state to record outer voice by executing the first starting instruction.

11. The method according to claim 9, wherein, when the first electronic device does not have a voice recording function, the step of generating the first instruction for entering into the voice record state comprises:
    generating a first control instruction for entering into the voice record state, to enable the first electronic device to generate a second starting instruction by executing the first control instruction, and then entering into the voice record state to record outer voice by executing the second starting instruction.

12. An electronic device, comprising at least one processor and a memory having processor-executable instructions stored therein, and the instructions when executed by the at least one processor, configure the device to:
    obtain, by a first sensor of the electronic device, a sensing parameter indicating that a device orientation is a second device orientation at a second time instant posterior to a first time instant when the device orientation of the electronic device is a first device orientation at the first time instant;
    determine, based on a first sensing parameter, whether the device orientation is adjusted from the first device orientation to the second device orientation that differs from the first device orientation;
    obtain a first temperature value of a first environment around the electronic device when the device orientation is the first device orientation and obtain a second temperature value of a second environment around the electronic device when the device orientation is the second device orientation in response to the device orientation being adjusted from the first device orientation to the second device orientation;
    determine whether the second temperature value is within a first predetermined range of temperature values and is different from the first temperature, in response to the second device orientation meeting a predetermined condition; and
    generate a first instruction for entering into a voice record state to enable the electronic device or a second electronic device that differs from the electronic device and is connected to the electronic device, to enter into the voice record state, in response to the second temperature being within the first predetermined range of temperature values and being different from the first temperature.

13. The electronic device according to claim 12, wherein the device is further configured to:
    determine whether the second device orientation meets a predetermined condition in response to the device orientation being adjusted from the first device orientation to the second device orientation; and
    generate the first instruction for entering into the voice record state in response to the second device orientation meeting the predetermined condition.

14. The electronic device according to claim 13, wherein the device is further configured to:
    obtain a second distance between the electronic device and a reference plane when the device orientation is the second device orientation, and obtain a first distance between the electronic device and the reference plane when the device orientation is the first device orientation; and
    determine whether the second distance is less than the first distance, and indicate that the second device orientation meets the predetermined condition in response to in response to the second distance being less than the first distance.

15. The electronic device according to claim 13, wherein the device is further configured to
    obtain a second distance between the electronic device and a reference plane when the device orientation is the second device orientation, and obtain a first distance between the electronic device and the reference plane when the device orientation is the first device orientation;
    determine whether the second distance is less than the first distance; and
    determine whether the second distance is within a predetermined range of distance in response to the second distance being less than the first distance, and indicate that the second device orientation meets the predetermined condition in response to the second distance being within the predetermined range of distance.

16. The electronic device according to claim 12, wherein the device is further configured to:
   obtain a second distance between the electronic device and a reference plane when the device orientation is the second device orientation, and obtain a first distance between the electronic device and the reference plane in when the device orientation is the first device orientation;
   determine whether the second distance is less than the first distance; and
   determine whether the second temperature value is larger than the first temperature value in response to the second distance being less than the first distance, and indicate that the second temperature value is within the first predetermined range of temperature values in response to the second temperature value being larger than the first temperature value.

17. The electronic device according to claim 13, wherein the device is further configured to
   obtain a second distance between the electronic device and a reference plane when the device orientation is the second device orientation, and obtain a first distance between the electronic device and the reference plane when the device orientation is the first device orientation;
   obtain a second angle value of the electronic device with respect to a reference plane when the device orientation is the second device orientation, and obtain a first angle value of the electronic device with respect to the reference plane when the device orientation is the first device orientation;
   determine whether the second distance is less than the first distance; and
   determine whether the second angle value is larger than the first angle value in response to the second distance being less than the first distance, and indicate that the second device orientation meets the predetermined condition in response to the second angle value being larger than the first angle value.

18. The electronic device according to claim 12, wherein the device is further configured to:
   determine whether the second temperature value is larger than the first temperature value; and
   determine whether the second temperature value is within a second predetermined range of temperature in response to the second temperature value being larger than the first temperature value; indicate that the second temperature value is within the first predetermined range of temperature values in response to the second temperature value being within the second predetermined range of temperature, it is indicated.

19. The electronic device according to claim 13, wherein the device is further configured to:
   obtain a second angle value of the electronic device with respect to a reference plane when the device orientation is the second device orientation, and obtain a first angle value of the electronic device with respect to the reference plane when the device orientation is the first device orientation;
   determine whether the second angle value is larger than the first angle value; and
   determine whether the second angle value is within a predetermined range of angle in response to the second angle value being larger than the first angle value, and indicate that the second device orientation meets the predetermined condition in response to the second angle value being within the predetermined range of angle.

20. The electronic device according to claim 12, wherein the device is further configured to:
   detect whether there is voice input from outside of the electronic device or the second electronic device during a predetermined time period and obtain a first detection result; and
   generate a second instruction for exiting from the voice record state in response to the first detection result indicating that there is no voice input during the predetermined time.

* * * * *